(12) United States Patent
Reavis

(10) Patent No.: US 7,854,852 B1
(45) Date of Patent: Dec. 21, 2010

(54) IN-DRAIN DEVICE FOR THE COLLECTION, EXTRACTION AND DIVERSION OF GRAY WATER FOR REUSE

(76) Inventor: Richard Martin Reavis, 2811 W. Clearview Dr., Tucson, AZ (US) 85745

( * ) Notice: Subject to any disclaimer, the term of this patent is extended or adjusted under 35 U.S.C. 154(b) by 0 days.

(21) Appl. No.: 12/726,211

(22) Filed: Mar. 17, 2010

(51) Int. Cl.
*B01D 37/00* (2006.01)

(52) U.S. Cl. ............... 210/767; 210/805; 210/163; 210/164; 210/416.1; 4/665; 4/679

(58) Field of Classification Search ............ 4/665
See application file for complete search history.

(56) References Cited

U.S. PATENT DOCUMENTS

| | | | | |
|---|---|---|---|---|
| 4,958,528 | A * | 9/1990 | Garrison | 73/864.63 |
| 5,092,003 | A * | 3/1992 | Weinberg | 4/693 |
| 5,186,052 | A * | 2/1993 | Gray | 73/215 |
| 5,210,886 | A * | 5/1993 | Coe, III | 4/665 |
| 5,243,719 | A * | 9/1993 | McDonald et al. | 4/665 |
| 5,274,861 | A * | 1/1994 | Ford | 4/665 |
| 5,313,677 | A * | 5/1994 | Coe | 4/683 |
| 5,345,625 | A * | 9/1994 | Diemand | 4/665 |
| 5,353,448 | A * | 10/1994 | Lee | 4/597 |
| 5,524,495 | A * | 6/1996 | Dudley | 73/863.52 |
| 5,744,731 | A * | 4/1998 | Dudley | 73/864.63 |
| 5,915,408 | A * | 6/1999 | Dudley | 137/244 |
| 6,139,729 | A * | 10/2000 | Gonzalez, Jr. | 210/164 |
| 6,192,915 | B1 * | 2/2001 | Valperz et al. | 137/172 |
| 6,282,733 | B1 * | 9/2001 | Gonzalez, Jr. | 4/665 |
| 6,314,590 | B1 * | 11/2001 | Lee | 4/286 |
| 6,578,597 | B2 * | 6/2003 | Groom et al. | 137/43 |
| 6,976,398 | B2 * | 12/2005 | Leoncavallo et al. | 73/863.52 |
| 7,195,602 | B2 * | 3/2007 | Yong et al. | 600/573 |
| 2006/0029517 | A1 * | 2/2006 | Hartselle | 422/61 |
| 2008/0257753 | A1 * | 10/2008 | Burton | 205/742 |

OTHER PUBLICATIONS

Webpages downloaded from www.MiragePacific.com on Sep. 20, 2010, 10 pages in total.*

* cited by examiner

*Primary Examiner*—Robert James Popovics

(57) ABSTRACT

Device inserted into a drain so that the top surface of the device is positioned and supported at the drain surface by means of a flange at the top surface of the device and sealing the drain by means of a gasket between the flange and the drain perimeter surface. Waste water, referred to as "gray water", directed to the drain enters the device by passing first through a thin horizontal plate perforated with numerous small holes to remove hair and debris and then passes through larger openings in the surface plate directly beneath the hair and debris guard. The water accumulates in the collection chamber and is extracted through means of a pick-up tube within the collection chamber having a fitting extending through the top of the device for connection to a fluid conduit attached to a suction pump. The extracted gray water is diverted or stored for reuse.

1 Claim, 2 Drawing Sheets

EXTERIOR VIEW

SIDE VIEW

TOP VIEW

IN-DRAIN DEVICE FOR THE COLLECTION, EXTRACTION AND DIVERSION OF GRAY WATER FOR REUSE

BACKGROUND OF THE INVENTION

The present invention is directed to the device for collecting gray water for reuse, especially as it pertains to, but not limited to, household showers, that otherwise would be lost through drainage into the sewer system. It is the purpose of this invention to provide a practical method for collecting gray water for reuse in, but not limited to, landscape irrigation thus reducing or eliminating the use of potable water for the same purpose. While other methods for collecting gray water have been employed, none is believed to operate with the efficiency or convenience of the present invention which functions uniquely within the drain.

SUMMARY OF THE INVENTION

The present invention fundamentally is comprised of a vertical collection chamber which is closed at the bottom and open at the top. The open end is affixed to and covered by a horizontal surface plate with multiple water inlet holes to allow water to rapidly enter the collection chamber. Positioned on top of the surface plate and covering the water inlet holes is a hair/debris guard consisting of a thin slightly convex plate perforated with numerous small diameter holes. The surface plate is of a sufficient diameter larger than that of the inside diameter of the drain in which the device is inserted to create a support flange that rests on the drain opening perimeter surface, positioning the device within the drain pipe thereby directing water into the device through the hair/debris guard and surface plate at floor level. A gasket beneath the surface plate flange prevents fluid from leaking around the device providing for maximum water collection. A pick-up tube extends from the surface plate down the interior length of the collection chamber to a point just above the bottom closed end. A fitting for connecting a fluid conduit is connected to the top end of the pick-up tube and extends through the top of the device. When the device is connected by a fluid conduit to the inlet of a suction pump and the pump is activated, water is continuously and efficiently extracted as it enters the device. The outlet conduit of the pump typically diverts the water directly to landscape irrigation or to a tank for storage and later use.

For a better appreciation of the operation of the present invention, as well as a greater understanding of the advantages to be derived from the practice of the present invention, reference should be made to the accompanying drawings taken in conjunction with the following detailed description of the invention.

DESCRIPTION OF THE DRAWINGS

Drawing 1 is a sectional representation of an in-drain gray water collection and extraction device embodying the principals of the present invention.

Drawing 2 is an exterior view of the present invention.

DETAILED DESCRIPTION OF THE INVENTION

Figure 1:
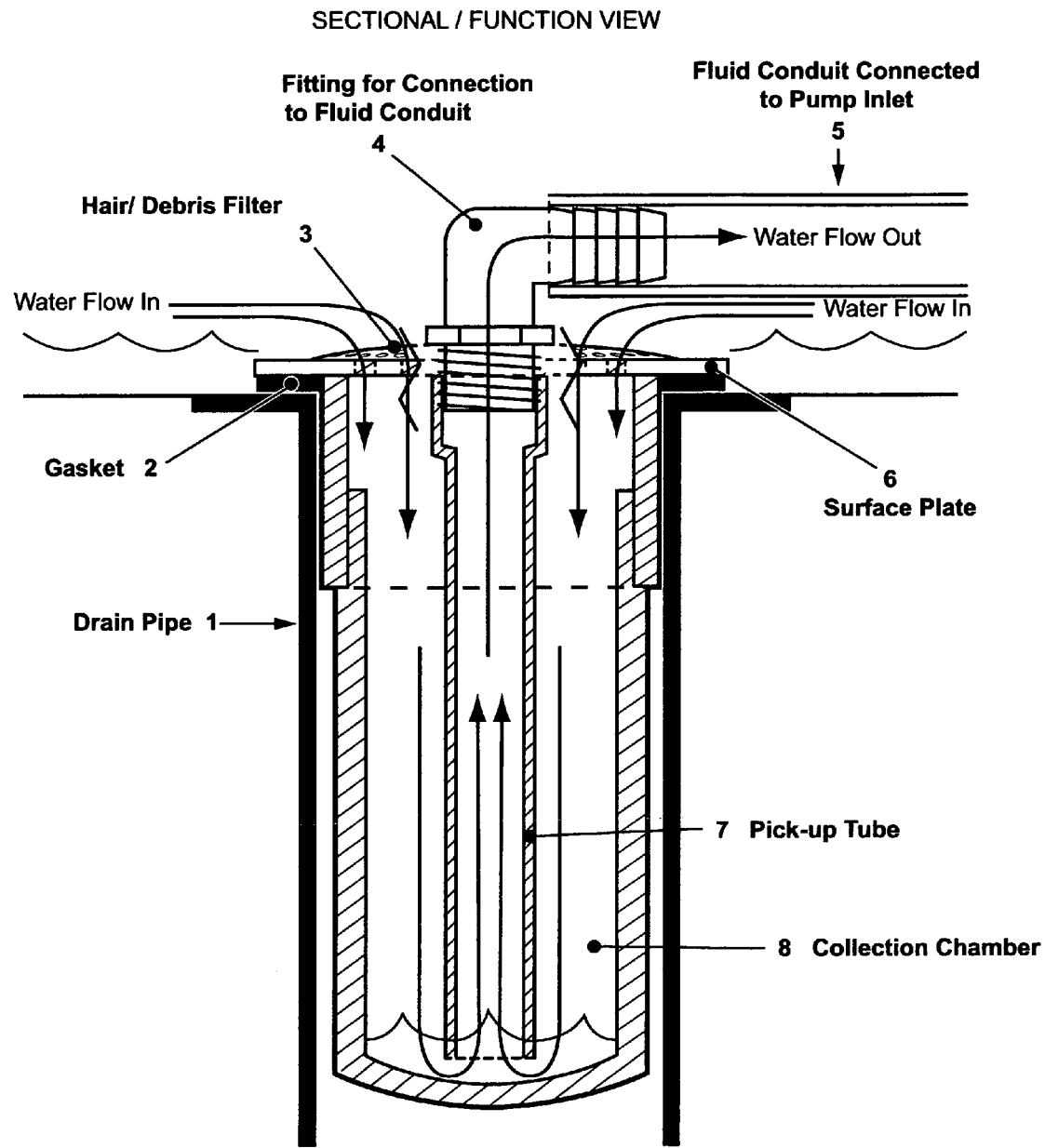
Figure 2:
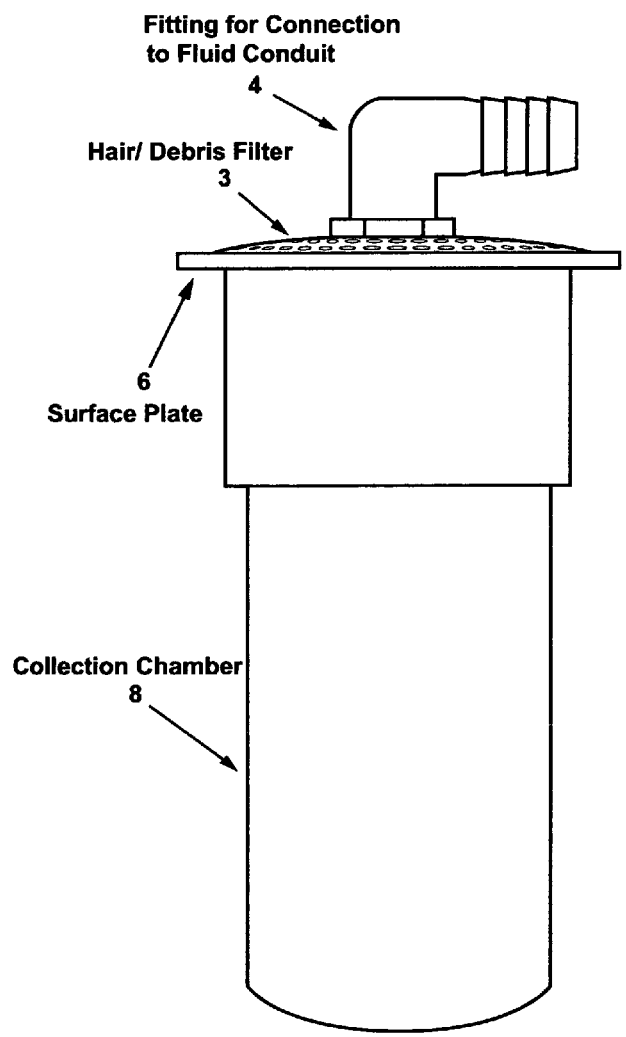
Figure 3:
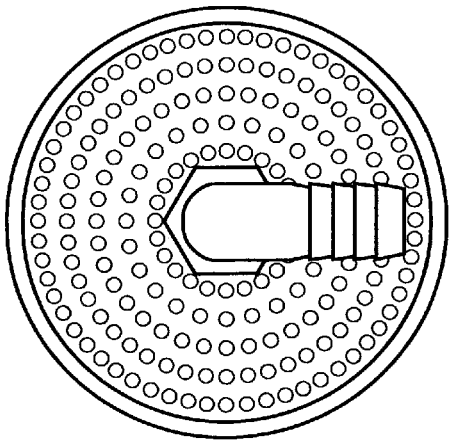

When the invention is installed in a drain as illustrated in DRAWING 1, gray water directed to the drain enters the device through the Hair/Debris Filter (FIG. 1), continues through openings in the Surface Plate (FIG. 2) and is collected in the Collection Chamber (FIG. 3). The water is extracted from the Collection Chamber through the Pick-up Tube (FIG. 4) by means of suction provided by a pump connected by a fluid conduit to the Fitting for Connection to Fluid Conduit (FIG. 5) at the top of the device. The gasket (FIG. 6) prevents fluid leakage around the device. It is intended, that in shower applications, water would be constantly extracted by use of a pump of an output flow exceeding the input flow rate of the shower head, to provide the same water extraction characteristics of a drain, so the bather is not standing in accumulating water. The in-drain design provides maximum efficiency in the collection, extraction and diversion of gray water for reuse.

What is claimed as being new and desired for patent protection is:

1. A Method of recycling gray water comprising the steps of:
    inserting a device into a drain to collect water that has been used, said device comprising:
        a vertical, cylindrical water collection chamber sealed at the bottom and open at the top;
        a circular, horizontal, top surface plate of a diameter greater than the drain inside diameter to support the device at the drain surface and perforated with inlet holes of sufficient number and size to allow water to pass through the plate unhampered relative to the volume of water flow directed to the device;
        a thin, circular, slightly convex plate perforated with numerous small holes of sufficient size to prevent the passage of hair and debris, positioned over the inlet holes and its perimeter in direct contact with the top surface plate;
        a pick-up tube connected to the bottom surface of the top surface plate extending the interior length of the collection chamber and is of a length such that the lower suction end is positioned in close proximity to the bottom interior surface of the chamber;
        a fitting attached to the pick-up tube through the top surface plate provides for connection to a fluid conduit connected to the inlet of a suction pump;
    collecting said used water;
    extracting said collected water from said device by connecting said device to a pump;
    and reusing said collected water.

* * * * *